(No Model.)
J. W. DWIGGINS.
WIRE FENCE MACHINE.
No. 494,983. Patented Apr. 4, 1893.
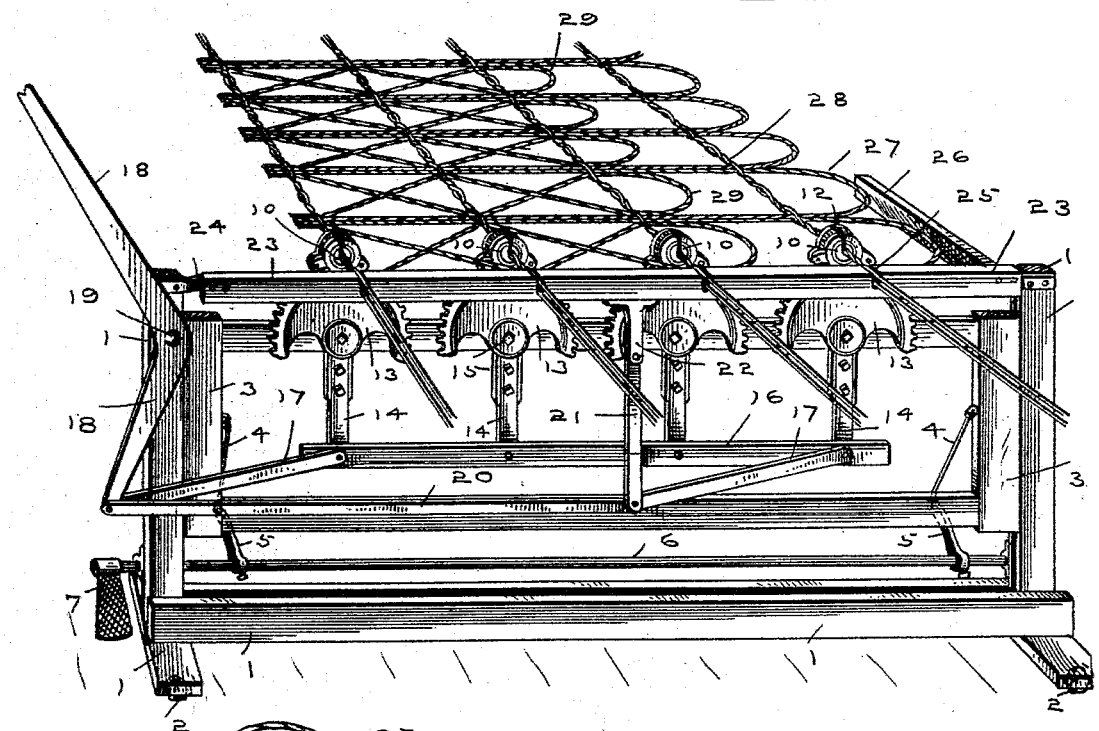
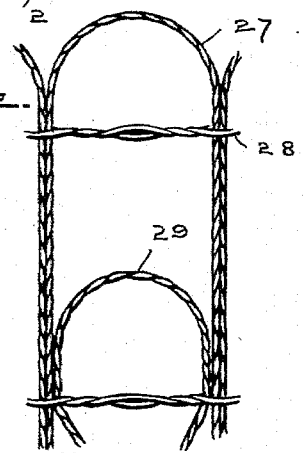
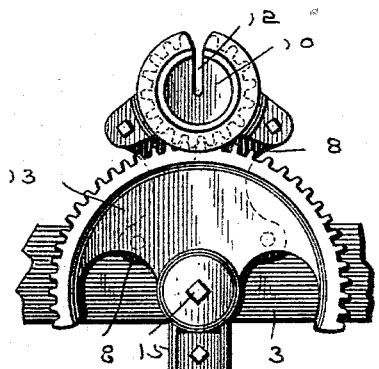
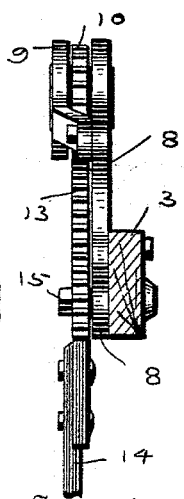
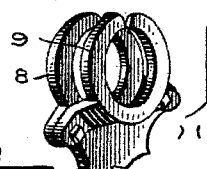
Witnesses
H. D. Nealy
E. P. Griffith
Inventor
John W. Dwiggins
By Attorney
V. H. Lockwood
THE NORRIS PETERS CO., PHOTO-LITHO., WASHINGTON, D. C.

UNITED STATES PATENT OFFICE.

JOHN W. DWIGGINS, OF FRANKTON, INDIANA, ASSIGNOR OF ONE-HALF TO LEROY URMSTON, OF SAME PLACE.

WIRE-FENCE MACHINE.

SPECIFICATION forming part of Letters Patent No. 494,983, dated April 4, 1893.

Application filed September 30, 1892. Serial No. 447,439. (No model.)

*To all whom it may concern:*

Be it known that I, JOHN W. DWIGGINS, of Frankton, county of Madison, and State of Indiana, have invented certain new and useful Improvements in Wire-Fence Machines; and I do hereby declare that the following is a full, clear, and exact description thereof, reference being had to the accompanying drawings, in which like figures refer to like parts.

My invention relates to new and useful improvements in wire fence machines, and is one that is especially adapted for use in making the fence shown and described in Letters Patent No. 474,952, issued to myself and J. V. Keck May 17, 1892, but may be used to make other kinds of wire fences, wherein the line wires are twisted between the pickets from the center instead of the end, and it will be understood from the following description.

In the drawings, Figure 1 is a perspective view of my machine, and a section of fence being operated upon. Fig. 2 is an enlarged detail view showing the manner of twisting the line wires. Fig. 3 is a detail view of the twister and its operating segment. Fig. 4 is an edge view of the same. Fig. 5 is a detail perspective view of the upper end of the bracket in which the twister is carried and operates. Fig. 6 is an edge view of the twister.

In detail, 1 represents the main frame of the machine, which is preferably supported on wheels 2, so that it may be readily moved about.

3 is a vertically movable framework, its end pieces having tongues thereon, which work in grooves formed in the uprights of the main frame 1.

4 are links connected to the framework 3, their lower ends connected with arms 5 rigidly mounted on the shaft or rod 6, which is supported in brackets from the main framework 1.

7 is a treadle on the outer end of the rod 6 for operating it, and through the links 4 moving the framework 3 vertically.

On the upper crossbar of the framework 3 are mounted brackets 8, each having secured at its top an auxiliary bracket 9 in whose face is formed a circular opening in line with a similar one in the main bracket 8.

10 is a twister having a circular flange or extension 11 formed on each side thereof which work loosely in the openings in the main bracket 8 and auxiliary bracket 9 between which the twister 10 operates. The twister 10 has a toothed periphery and a slot 12 extends from between two of its teeth to a point a little past its center, such slot not being wide enough below its flaring mouth to admit two wires side by side. Slots are also formed in the top of the main and auxiliary brackets and are adapted to register with the slot 12 when the twister is in its normal or first position.

13 is a toothed segment pivoted to the main bracket 8 at 15, its teeth engaging with those of the twister above and through this segment the twister is operated.

14 is a lever or arm secured to the extension on the lower end of the segment 13, and all the levers 14 are pivoted to the crossbar or plate 16.

17 are links connected to either end of this crossbar, the outer one having its opposite end pivoted directly to an operating lever 18, which is pivoted at 19 to the main frame 1 of the machine. The inner link 17 is pivoted to the outer end of the connecting rod 20, whose opposite end is pivoted to the operating lever 18, 21 being an arm, its lower end pivoted to the inner end of the connecting rod 20, and its upper end pivoted to a bracket 22 supported from the crossbar 23, which is connected by brackets 24 to the main frame 1, and a little in front of the twisters. The crossbar 23 has narrow slots or notches 25 in its upper side and is in line with the slots in the brackets 8 and 9 carrying the twisters, the slots 25 serving to retain the wire in a fixed position, and also to prevent its twisting in front of the machine.

26 is a guide plate or piece secured to the crossbar 23, and is set on a line where the tops of the fence pickets are desired to come, 28 being the main line wires for securing the pickets or loops 27 and 29 together, as hereinafter described.

The operation of my machine is as follows:—A series of double wires are first stretched at any suitable point, the distance between each being regulated by the slots 25 in the top of the crossbar 23 of the machine. The machine being set in position beneath the line wires which enter the slots 25 and are thereby retained in a fixed position. In the normal position of the machine, or before use, the operating arm of the lever 18 is about in a horizontal position, the segments 13 engaging with the twisters near one of their ends and the slots in the twister are in line with the slots in the brackets 8 and 9, the movable framework 3 being down in its lower position, thus bringing the twisters below and out of engagement with the line wires 28. These being the positions of the several parts, a picket 27, and, if desired, an inner and shorter picket 29 is laid in place between the upper and lower series of line wires, the upper end of the longer picket abutting against the guide plate 26 and the side of the picket abutting against the crossbar 23, thus bringing the two sides of the picket at equal distances on either side on a line with the twisters, whereupon by depressing the foot treadle 7 the framework 3 will be forced up, the main line wires being guided into the slots 12 of the twisters as they move upward, until these wires reach the bottom of the slots, one wire in each strand being on the other. By throwing the operating arm of the lever upward into a vertical position through the connecting rod 20 and the links 17 the crossbar 16 will be thrown outward, moving with it the arms 14 connected to the segments 13, and thereby turning such segments on their pivotal points, and through the engagement of the segments with the twisters rotating the same several times, and twisting the two main line wires constituting each strand at their center between the pickets, as shown in Fig. 2. At this time, when the complete operation of twisting the main wires has been completed, the slots 12 of the twister will again be in line with the slots in the brackets 8 and 9, and upon releasing the pressure of the foot treadle 7, the main frame 3 will drop back to its normal position, carrying with it the brackets 8 and the twisters 10, and thereby releasing the main wires from such twisters, whereupon the lever 18 is thrown back to its normal or lower position, and the machine may be then rolled forward far enough to allow the insertion of another picket 28, when the same operation is gone through as before. It will thus be seen that with my machine all of the main wires of the fence are twisted between the pickets in the same manner, and all to the same degree, and the machine may be made to operate on as many main wires as may be desired.

The main part of my invention is the construction and operation of the twisting mechanism, and while the other parts of my machine are novel, many modified forms might be used to attain the same result. As, if desired, a gear wheel might be substituted for each of the segments 13, and a sprocket chain or rack bar engage with the lower side of each, and with suitable means for operating the same, the operation and result would be substantially the same as in my present machine. I therefore do not wish to limit myself to any particular form of construction of machinery for operating the twister. The twisters herein shown are also adapted for use in tensioning the fence when set up by utilizing merely the bracket carrying the segments and the twister, a handle being formed on the bracket, and a handle or crank on the segment, and at any point where the fence would be loose on its supports, by slipping the main line wires 28, which have been before twisted, into the slot 12 of the twisting wheel and operating on the segment, the tension of the main line wires may be increased.

What I claim as my invention, and desire to secure by Letters Patent, is the following:

1. In a wire twisting machine, the combination with the framework thereof having an upper crossbar containing a narrow transverse slot, of a vertically movable frame and a suitable twisting mechanism mounted on such movable frame to one side of such crossbar and in line with the slot therein, substantially as shown and described.

2. In a wire twisting machine, a vertically movable frame having mounted upon it ring brackets, a twister consisting of a wheel having a slot extending from near its center to its periphery and flanges extending from each side of such wheel and rotating in such ring brackets, a series of levers suitably pivoted to the framework of the machine, such levers having on one end toothed segments adapted to rotate such twister, and a bar connecting the other ends of such levers, substantially as shown and described.

3. In a wire twisting machine, in combination with the main frame of the machine having a crossbar at its top adapted to support the wires, a movable frame fitting in such main frame and having suitable twisting mechanism on it, a revoluble shaft attached to the main frame having on one end a pedal to turn the shaft, and suitable arms rigidly fixed to the shaft and so connected by links to such movable frame as to elevate the same to the wires when the pedal is operated, substantially as shown and described.

4. In a wire fence machine, the combination of the framework thereof having an upper crossbar containing narrow transverse slots at such distance apart as the strands to be twisted are desired, a vertically movable frame, and a series of wheels mounted on such movable frame to one side of such crossbar, such wheels having slots from near their center outward and being in line with and corresponding with the slots in the crossbar, substantially as shown and described.

5. In a wire fence machine, the combination of the framework thereof having an upper crossbar provided with narrow transverse slots at such distance apart as the main strands to be twisted are desired, a vertically movable frame, a series of toothed wheels mounted on such movable frame to one side of such crossbar, having slots from near their center outward and located in line with the slots in such crossbar, a series of levers suitably pivoted to such movable framework, such levers having toothed segments on one end adapted to engage and rotate such wheels, a bar connecting the other ends of such levers, and a lever pivoted to the framework and adapted to operate such connecting bar, substantially as shown and described.

In witness whereof I have hereunto set my hand this 23d day of September, 1892.

JOHN W. DWIGGINS.

Witnesses:
J. E. EARNEST,
B. F. DAVIS.